United States Patent
Wang et al.

(10) Patent No.: US 10,564,488 B2
(45) Date of Patent: Feb. 18, 2020

(54) DISPLAY PANEL, DISPLAY DEVICE AND CONTROL METHOD THEREOF

(71) Applicant: BOE TECHNOLOGY GROUP CO., LTD., Beijing (CN)

(72) Inventors: Haiyan Wang, Beijing (CN); Xue Dong, Beijing (CN); Wenqing Zhao, Beijing (CN); Zhongxiao Li, Beijing (CN); Chenyu Chen, Beijing (CN); Xiaochen Niu, Beijing (CN); Qian Wang, Beijing (CN); Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 15 days.

(21) Appl. No.: 15/760,883

(22) PCT Filed: Sep. 8, 2017

(86) PCT No.: PCT/CN2017/101031
§ 371 (c)(1),
(2) Date: Mar. 16, 2018

(87) PCT Pub. No.: WO2018/141154
PCT Pub. Date: Aug. 9, 2018

(65) Prior Publication Data
US 2019/0129257 A1    May 2, 2019

(30) Foreign Application Priority Data
Feb. 6, 2017  (CN) .......................... 2017 1 0065595

(51) Int. Cl.
*G02F 1/1343* (2006.01)
*G02F 1/1335* (2006.01)
*G02F 1/139* (2006.01)

(52) U.S. Cl.
CPC ........ *G02F 1/134309* (2013.01); *G02F 1/139* (2013.01); *G02F 1/133504* (2013.01);
(Continued)

(58) Field of Classification Search
CPC ................................................. G02F 1/134309
See application file for complete search history.

(56) References Cited

U.S. PATENT DOCUMENTS

2013/0242228 A1* 9/2013 Park ................. G02F 1/133617
349/61
2014/0063382 A1 3/2014 Wu
(Continued)

FOREIGN PATENT DOCUMENTS

CN    102629041 A    8/2012
CN    202443185 U    9/2012
(Continued)

OTHER PUBLICATIONS

Lee, You-Jin; "Polarizer-free liquid crystal display with electrically switchable microlens array," Jan. 2, 2013; Optical Society of America ;Optics Express 129 vol. 21, No. 1 (Year: 2013).*
(Continued)

*Primary Examiner* — Edmond C Lau
(74) *Attorney, Agent, or Firm* — Dave Law Group LLC; Raj S. Dave

(57) ABSTRACT

Embodiment of the disclosure provide a display panel, a display device and a control method thereof, which belong to the field of display technology. The display panel comprises: a first base substrate and a second base substrate that are provided opposite to each other; and a plurality of pixel units formed between the first base substrate and the second base substrate. The pixel unit of the plurality of pixel units comprises: a liquid crystal adjustment unit; and a first light-shielding region and a first light-transmitting region at
(Continued)

the first side of the liquid crystal adjustment unit. The liquid crystal adjustment unit comprises an adjustment electrode and a liquid crystal layer. The adjustment electrode is configured to control the deflection of the liquid crystals in the liquid crystal layer such that the light from the second side of the liquid crystal adjustment unit is transmitted to at least one of the first light-shielding region and the first light-transmitting region.

19 Claims, 10 Drawing Sheets

(52) U.S. Cl.
CPC .. *G02F 1/133512* (2013.01); *G02F 1/133514* (2013.01); *G02F 1/133617* (2013.01); *G02F 1/133603* (2013.01); *G02F 2001/134381* (2013.01); *G02F 2201/121* (2013.01); *G02F 2201/123* (2013.01); *G02F 2203/30* (2013.01)

(56) References Cited

U.S. PATENT DOCUMENTS

| | | | |
|---|---|---|---|
| 2014/0063413 | A1 | 3/2014 | Kim |
| 2016/0070137 | A1 | 3/2016 | You et al. |
| 2016/0124271 | A1* | 5/2016 | Kang ................ G02F 1/133621 349/68 |
| 2017/0299773 | A1 | 10/2017 | Guo |

FOREIGN PATENT DOCUMENTS

| | | |
|---|---|---|
| CN | 102830539 A | 12/2012 |
| CN | 202693951 U | 1/2013 |
| CN | 103293789 A | 9/2013 |
| CN | 104570425 A | 4/2015 |
| CN | 105093652 A | 11/2015 |
| CN | 105589245 A | 5/2016 |
| CN | 106338871 A | 1/2017 |
| CN | 106773379 A | 5/2017 |

OTHER PUBLICATIONS

Written Opinion from PCT Application No. PCT/CN2017/101031 dated Nov. 30, 2017 (6 pages).
International Search Report from PCT Application No. PCT/CN2017/101031 dated Nov. 30, 2017 (5 pages).
Office Action from Chinese Application No. 201710065595.2 dated May 5, 2019 (7 pages).

* cited by examiner

DISPLAY PANEL, DISPLAY DEVICE AND CONTROL METHOD THEREOF

CROSS-REFERENCES TO RELATED APPLICATION

This application claims the benefit and priority of Chinese Patent Application No. 201710065595.2 filed on Feb. 6, 2017, the entire content of which is incorporated by reference herein as part of the present disclosure.

FIELD

The disclosure relates to the field of display technology, and in particular, to a display panel, a display device and a control method thereof.

BACKGROUND

With the development of display technology, various products with display devices appear in daily life, such as mobile phones, tablet computers, televisions, displays, notebook computers, digital photo frames, navigators and the like.

Currently, the mainstream display devices in the market comprise thin film transistor liquid crystal displays (TFT-LCD for short). A display panel in TFT-LCDs generally comprises an upper polarizer and a lower polarizer. The upper polarizer is attached to the light emergent side of the display panel, the lower polarizer is attached to the light incident side of the display panel, and the absorption axis of the upper polarizer and the absorption axis of the lower polarizer are perpendicular to each other. The polarizer can absorb light parallel to the absorption axis and transmit light perpendicular to the absorption axis. The light incident on the display panel firstly passes through the lower polarizer, then changes its polarization direction in the liquid crystal layer, and finally exits through the upper polarizer. In different display units, the degree of change of the polarization direction by the liquid crystal layer is different, which causes the degree of absorption of light by the upper polarizer different, and then the luminance shown by different display units is different, achieving the purpose of displaying images on the display panel.

In this process, both the upper polarizer and the lower polarizer absorb light through the absorption axis, resulting in lower light transmittance.

SUMMARY

Embodiments of the present disclosure provide a display panel, a display device and a control method thereof.

A first aspect of the embodiments of the present disclosure provides a display panel, comprising: a first base substrate and a second base substrate that are provided opposite to each other, and a plurality of pixel units formed between the first base substrate and the second base substrate. The pixel unit of the plurality of pixel units comprises: a liquid crystal adjustment unit, and a first light-shielding region and a first light-transmitting region at the first side of the liquid crystal adjustment unit. The liquid crystal adjustment unit comprises an adjustment electrode and a liquid crystal layer. The adjustment electrode is configured to control the deflection of the liquid crystals in the liquid crystal layer such that the light from the second side of the liquid crystal adjustment unit is transmitted to at least one of the first light-shielding region and the first light-transmitting region.

In embodiments of the present disclosure, the pixel unit further comprises: a scattering medium pattern provided in the first light-transmitting region. The scattering medium pattern is configured to scatter the light that has been transmitted to the first light-transmitting region.

In embodiments of the present disclosure, the scattering medium pattern comprises a color filter. The color filter is provided with a plurality of scattering particles for scattering light.

In embodiments of the present disclosure, the pixel unit further comprises a quantum dot element provided in the first light-transmitting region. The quantum dot element is configured to emit light upon being excited by the light that has been transmitted to the first light-transmitting region.

In embodiments of the present disclosure, the quantum dot element is excited by blue light to emit at least one of red light and green light.

In embodiments of the present disclosure, the quantum dot element is configured to emit light in a scattering manner.

In embodiments of the present disclosure, the first base substrate is located at the first side of the pixel unit and the second base substrate is located at the second side of the pixel unit. The pixel unit further comprises a second light-shielding region and a second light-transmitting region located at the second side of the liquid crystal adjustment unit. The pixel unit further comprises a first light-shielding pattern and a second light-shielding pattern. The first light-shielding pattern is located in the first light-shielding region and is provided on the first base substrate. The second light-shielding pattern is located in the second light-shielding region and is provided on the second base substrate.

In embodiments of the present disclosure, the adjustment electrode comprises a first electrode provided on the first base substrate and a second electrode provided on the second base substrate. The first electrode comprises a plate-shaped electrode, and the second electrode comprises a strip-shaped first and second sub-electrode.

In embodiments of the present disclosure, the first sub-electrode and the second sub-electrode are respectively located at two ends of the pixel unit. The pixel unit further comprises a first planar layer that covers the second light-shielding pattern and extends to the first light-transmitting region. The first sub-electrode and the second sub-electrode are provided on the first planar layer.

In embodiments of the present disclosure, the second light-shielding pattern comprises a first sub-pattern and a second sub-pattern. The first sub-pattern and the second sub-pattern are respectively located at two ends of the pixel unit. The orthographic projection on the second base substrate of the first sub-pattern covers the orthographic projection on the second base substrate of the first sub-electrode. The orthographic projection on the second base substrate of the second sub-pattern covers the orthographic projection on the second base substrate of the second sub-electrode.

In embodiments of the present disclosure, the first electrode is provided with a via. The orthographic projection on the second base substrate of the via is located between the orthographic projection on the second base substrate of the first sub-electrode and the orthographic projection on the second base substrate of the second sub-electrode.

In embodiments of the present disclosure, the distance from the orthographic projection of the via on the second base substrate to the orthographic projection on the second base substrate of the first sub-electrode is substantially equal to the distance from the orthographic projection of the via on the second base substrate to the orthographic projection on the second base substrate of the second sub-electrode.

In embodiments of the present disclosure, both the first sub-electrode and the second sub-electrode are transparent electrodes, and are located in the second light-transmitting region.

In embodiments of the present disclosure, the pixel unit further comprises a first planar layer and a second planar layer. The first planar layer covers the second light-shielding pattern and extends to the second light-transmitting region. The first sub-electrode is located on the first planar layer. The second planar layer covers the first sub-electrode. The second sub-electrode is located on the second planar layer.

In embodiments of the present disclosure, the second electrode further comprises a third sub-electrode. The third sub-electrode is in one of the following situations: i) being covered by the first planar layer; ii) being located on the first planar layer and covered by the second planar layer; iii) being located on the second planar layer; iv) being located on the third planar layer, wherein the third planar layer covers the second sub-electrode.

A second aspect of the embodiments of the present disclosure provides a display device, comprising: any one of the display panels described above, and a backlight source provided at the second side of the display panel. The backlight source comprises: a plurality of light-emitting units. The plurality of light-emitting units correspond to the plurality of pixel units one to one. The light emitted by the light-emitting unit of the plurality of light-emitting units is perpendicular to at least one of the first base substrate and the second base substrate.

In embodiments of the present disclosure, the light-emitting unit comprises a light-emitting diode.

In embodiments of the present disclosure, the light-emitting diode is a blue light-emitting diode.

A third aspect of the embodiments of the present disclosure provides a control method of a display device for controlling the display device described above. The control method comprises: controlling the voltage on the adjustment electrode of each pixel unit so as to deflect the liquid crystals in the liquid crystal layer; and transmitting the light from the backlight source to at least one of the first light-shielding region and the first light-transmitting region.

In embodiments of the present disclosure, the control method comprises: transmitting the light from the backlight source to the first light-shielding region, to display a zero-grayscale image; transmitting the light from the backlight source to the first light-transmitting region, to display a maximum-grayscale image; and transmitting the light from the backlight source to the first light-shielding region and the first light-transmitting region, to display an N-grayscale image, where 0<N<M, and M is the maximum grayscale.

In embodiments of the present disclosure, the deflection of the liquid crystals in the liquid crystal layer is controlled by the adjustment electrode in the liquid crystal adjustment unit, such that the light from the second side of the liquid crystal adjustment unit is emitted to at least one of the first light-shielding region and the first light-transmitting region. By changing the proportions of the lights transmitted to the first light-shielding region and to the first light-transmitting region, different grayscales can be displayed for the purpose of displaying images, without the need for a polarizer, effectively improving the light transmittance of the display panel.

BRIEF DESCRIPTION OF THE DRAWINGS

In order to more clearly illustrate the technical solutions of the embodiments of the disclosure, the drawings of the embodiments will be briefly described below, and it should be appreciated that the drawings described below merely relate to some of the embodiments of the disclosure, rather than limiting the disclosure, in which.

DETAILED DESCRIPTION

In order to make the technical problems to be solved, technical solutions and advantages of the embodiments of the disclosure clearer, the technical solutions in the embodiments of the disclosure will be clearly and completely described below in conjunction with the accompanying drawings in the embodiments of the disclosure. It is obvious that the described embodiments are part, instead of all, of the embodiments of the disclosure. All other embodiments obtained by those skilled in the art based on the described embodiments of the disclosure without the need for creative labor also fall within the scope of the disclosure.

Figure 1:
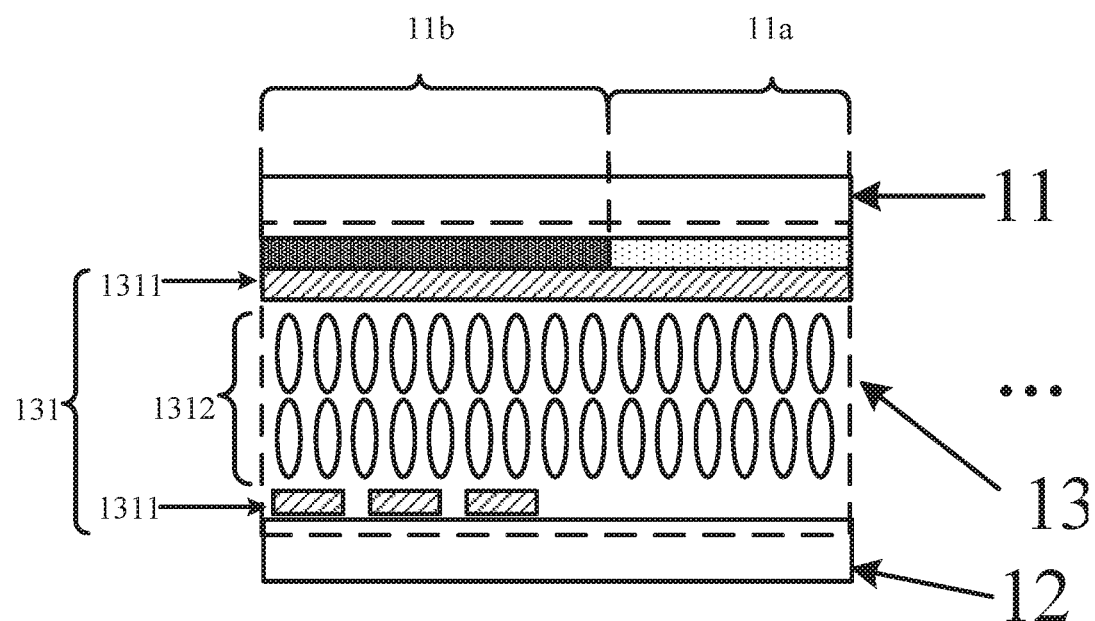
FIG. 1 is a schematic structural view of a display panel provided by a first embodiment of the present disclosure.

Embodiments of the present disclosure provide a display panel. As shown in FIG. 1, FIG. 1 is a schematic structural view of a display panel provided by a first embodiment of the present disclosure. The display panel comprises: a first base substrate 11 and a second base substrate 12 that are provided opposite to each other, and a plurality of pixel units 13 formed between the first base substrate 11 and the second base substrate 12. The pixel unit 13 comprises: a liquid crystal adjustment unit 131, and a first light-transmitting region 11a and a first light-shielding region 11b at the first side of the liquid crystal adjustment unit 131. The liquid crystal adjustment unit 131 comprises an adjustment electrode 1311 and a liquid crystal layer 1312. The adjustment electrode 1311 is configured to control the deflection of the liquid crystals in the liquid crystal layer 1312 such that the light from the second side of the liquid crystal adjustment unit 131 is transmitted to at least one of the first light-shielding region 11b and the first light-transmitting region 11a. The light transmitted to the first light-shielding region 11b will be blocked. The light transmitted to the first light-transmitting region 11a can transmit outward, for example, to be seen by the user.

In embodiments of the present disclosure, the deflection of the liquid crystals in the liquid crystal layer is controlled by the adjustment electrode in the liquid crystal adjustment unit, such that the light from the second side of the liquid crystal adjustment unit is emitted to at least one of the first light-shielding region and the first light-transmitting region. By changing the proportions of the light transmitted to the first light-shielding region and to the first light-transmitting region, different grayscales can be displayed for the purpose of displaying images, without the need for a polarizer, effectively improving the light transmittance of the display panel.

Figure 2:
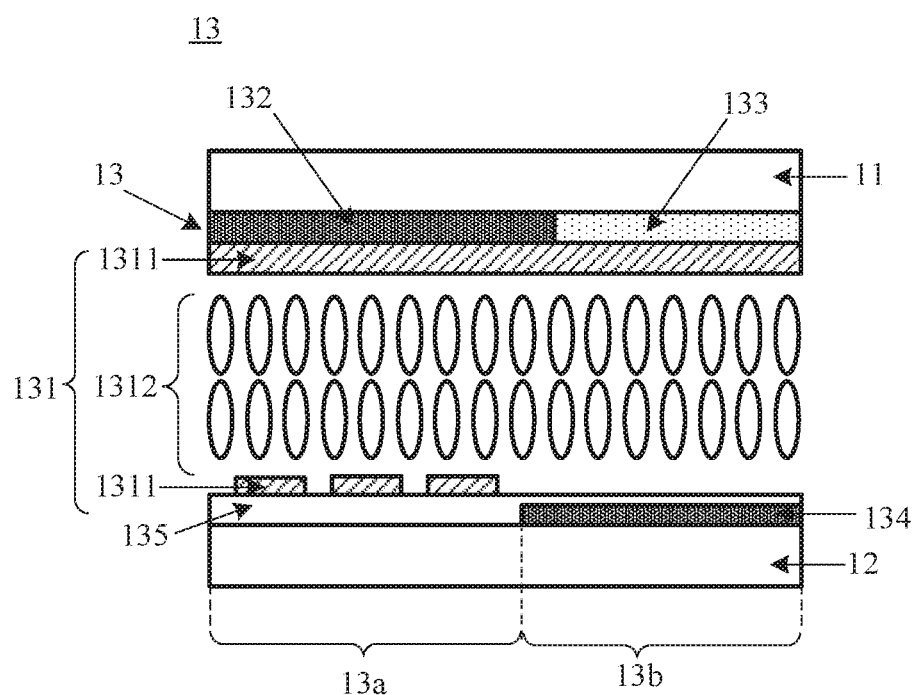
FIG. 2 is a partial enlarged schematic view of the display panel shown in FIG. 1.

FIG. 2 is a partial enlarged schematic view of the display panel shown in FIG. 1. As shown in FIG. 2, the pixel unit 13 may further comprise: a scattering medium pattern 133 provided in the first light-transmitting region 11a. The scattering medium pattern 133 is configured to scatter the light transmitted to the first light-transmitting region 11a. The scattering medium pattern 133 may comprise a color filter. The color filter may be provided with a plurality of scattering particles for scattering light.

Alternatively or additionally, the pixel unit 13 may further comprise a quantum dot element provided in the first light-transmitting region 11a. The quantum dot element is configured to emit light upon being excited by the light transmitted to the first light-transmitting region 11a. The quantum dot element may be excited by blue light to emit at least one of red light and green light. The quantum dot element may be configured to emit light in a scattering manner.

In summary, the first light-transmitting region 11a can directly transmit the light from the liquid crystal adjustment unit 131 and can also emit light by itself.

As shown in FIG. 2, the first base substrate 11 is located at the first side (i.e., the light emergent side) of the pixel unit 13 and the second base substrate 12 is located at the second side (i.e., the light incident side) of the pixel unit 13. The pixel unit 13 further comprises a second light-shielding region 13b and a second light-transmitting region 13a located at the second side of the liquid crystal adjustment unit 131. The pixel unit 13 further comprises a first light-shielding pattern 132 and a second light-shielding pattern 134. The first light-shielding pattern 132 is located in the first light-shielding region 11b and is provided on the first base substrate 11. The second light-shielding pattern 134 is located in the second light-shielding region 13b and is provided on the second base substrate 12.

The liquid crystal adjustment unit 131 is provided between the first base substrate 11 and the second base substrate 12. The first light-shielding pattern 132 and the scattering medium pattern 133 are located at the first side (i.e., the light emergent side) of the liquid crystal adjustment unit 131. The second light-shielding region 13a and the second light-transmitting region 13b are located at the light incident side of the liquid crystal adjustment unit 131. The second light-shielding pattern 134 is provided in the second light-shielding region 13b. As an example, the materials of the first light-shielding pattern 132 and the second light-shielding pattern 134 may both be black resin.

At the light emergent side, the first light-shielding pattern 132 is for blocking light, and the scattering medium pattern 133 is for scattering light. When light is emitted to the scattering medium pattern 133, the scattering medium pattern 133 may emit light at a large scattering angle in a scattering manner. When a large grayscale image is displayed, the occurrence of obvious dark spots at the first light-shielding pattern 132 with respect to the pixel unit is avoided, reducing the influence thereof on the image display effect. In practical applications, a planar layer 135 extending to the second light-transmitting region 13a may be provided on the second light-shielding pattern 134.

Optionally, in each pixel unit 13, the orthographic projections on the second base substrate 12 of the first light-shielding pattern 132 and the scattering medium pattern 133 may completely cover the orthographic projection on the second base substrate 12 of the liquid crystal adjustment unit 131. That is, in one pixel unit 13, there is no gap between the first light-shielding pattern 132 and the scattering medium pattern 133, such that light leakage can be avoided.

The liquid crystal adjustment unit 131 comprises an adjustment electrode 1311 and a liquid crystal layer 1312, the adjustment electrode 1311 being for controlling the deflection of the liquid crystals in the liquid crystal layer 1312 such that light incident on the liquid crystal adjustment unit 131 passes through the liquid crystal layer 1312 and can be transmitted to the first light-shielding pattern 132 and/or the scattering medium pattern 133.

In summary, the display panel provided by the embodiment of the present disclosure may control the deflection of the liquid crystals in the liquid crystal layer by means of the adjustment electrode in the liquid crystal adjustment unit, to adjust the direction of light incident on the liquid crystal adjustment unit. After the light passes through the liquid crystal layer, the light-shielding pattern can be used to block the light and/or the light is allowed to pass through the scattering medium pattern, such that different grayscales can be displayed for the purpose of displaying images, without the need for a polarizer, effectively improving the light transmittance of the display panel.

Figure 3:
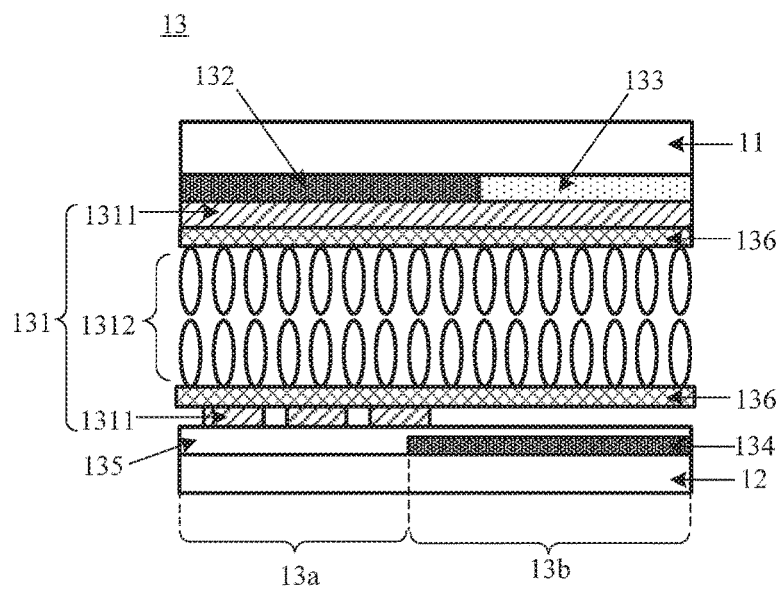
FIG. 3 is a schematic structural view of a display panel provided by a second embodiment of the present disclosure.

FIG. 3 is a schematic structural view of a display panel provided by a second embodiment of the present disclosure. As shown in FIG. 3, the first light-shielding pattern 132 and the scattering medium pattern 133 may be provided on the first base substrate 11. The second light-shielding pattern 134 may be provided on the second base substrate 12, and alignment layers 136 are further provided on both sides of the liquid crystal layer 1312. The alignment layer 136 can allow the liquid crystals in the liquid crystal layer 1312 to be arranged according to a certain rule.

In the embodiments of the present disclosure, there are many possible implementations for the relative positions of the second light-shielding pattern 134 and the first light-shielding pattern 132.

Figure 4:
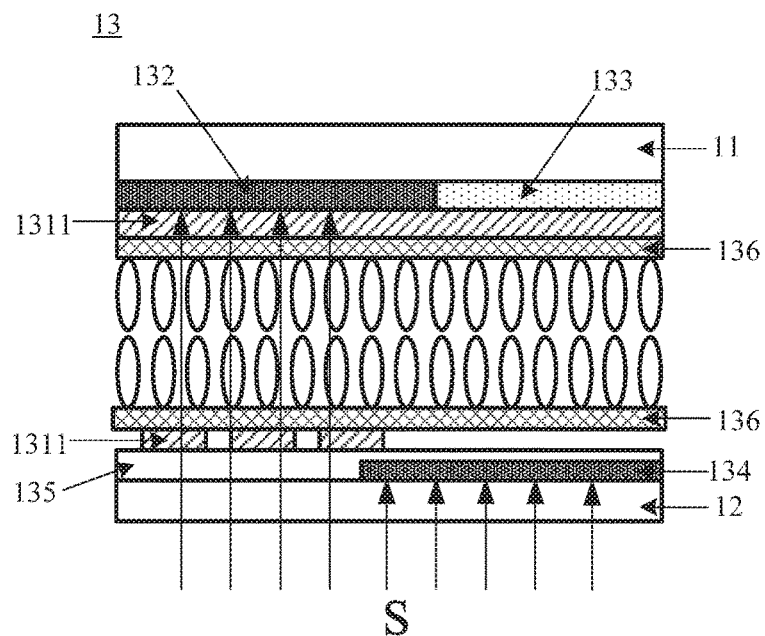
FIG. 4 is a schematic view of the optical path of the display panel shown in FIG. 3 when displaying a zero-grayscale image.

FIG. 4 is a schematic view of the optical path of the display panel shown in FIG. 3 when displaying a zero-grayscale image. In one possible implementation, as shown in FIG. 4, the orthographic projection on the first base substrate 11 of the second light-shielding pattern 134 covers the scattering medium pattern 133. When no driving voltage is applied to the adjustment electrode 1311, the liquid crystals in the liquid crystal layer are not deflected in this case, and the light S incident from the second base substrate 12 is all blocked by the first light-shielding pattern 132 and the second light-shielding pattern 134. Each pixel unit 13 displays a zero-grayscale image. The display panel shown in FIG. 4 is generally referred to as a "normally black mode" display panel, and the operating mode to which it corresponds when no driving voltage is applied is "normally black mode".

Figure 5:
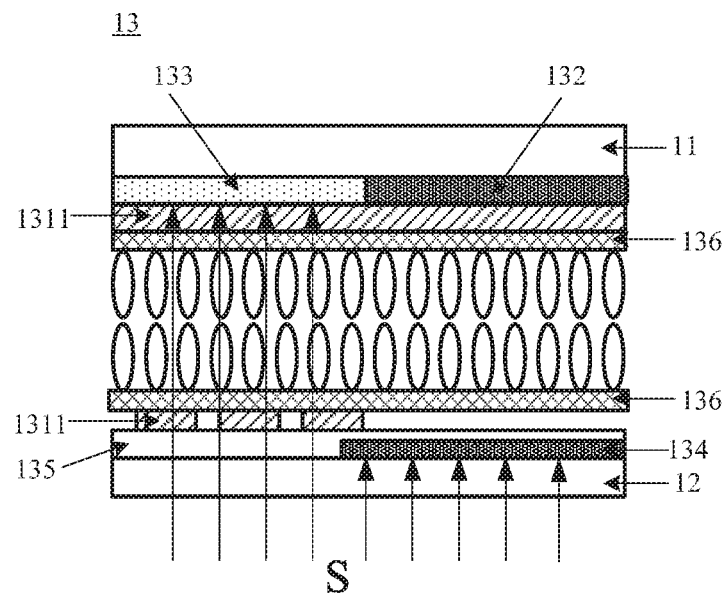
FIG. 5 is a schematic view of the optical path of a display panel when displaying a maximum-grayscale image provided by a third embodiment of the present disclosure.

FIG. 5 is a schematic view of the optical path of a display panel when displaying a maximum-grayscale image provided by a third embodiment of the present disclosure. As shown in FIG. 5, the third embodiment differs from the second embodiment shown in FIG. 3 in that the orthographic projection on the first base substrate 11 of the second light-shielding pattern 134 covers the first light-shielding pattern 132. The liquid crystals in the liquid crystal layer are not deflected when no driving voltage is applied to the adjustment electrode 1311, light incident from the second base substrate 12 may exit through the scattering medium pattern 133, and the light is not blocked by the first light-shielding pattern 132. Each pixel unit 13 displays a maximum-grayscale image. The display panel shown in FIG. 5 is generally referred to as a "normally white mode" display panel, and the operating mode to which it corresponds when no voltage is applied is "normally white mode". In the "normally white mode", the second light-shielding pattern 134 may not be provided, but there is a large risk of light leakage or bright line generation, resulting in contrast (the contrast refers to the ratio of the luminance when the display panel displays a maximum-grayscale image to the luminance when displaying a zero-grayscale image) decrease. Therefore, in the embodiment of the present disclosure, the second light-shielding pattern 134 is also provided in the "normal white mode" to avoid external light interference and inter-pixel light interference, reducing the risk of light leakage and bright line generation, and at the same time improving the contrast.

In the following description, taking the "normally black mode" display panel as an example. The structure of the "normally white mode" display panel may be the same as that of the "normally black mode" display panel, except that the positions of the first-shielding pattern 132 and the scattering medium pattern 133 in the "normally white mode" display panel are opposite to the positions of the first-shielding pattern 132 and the scattering medium pattern 133 in the "normally black mode" display panel. When displaying the same grayscale image, the driving voltage of the adjustment electrode of the "normally white mode" display panel may be opposite to the driving voltage of the adjustment electrode of the "normally black mode" display panel in terms of polarity. For other part of the control method, reference may be made to the "normally black mode" display panel.

In the embodiments of the present disclosure, when the adjustment electrode adjusts the liquid crystal layer, the liquid crystal layer may be controlled to have at least two liquid crystal regions formed therein with different refractive indexes. This situation can be considered as the liquid crystal layer forming a liquid crystal prism. The larger the nd value of the liquid crystal prism formed by the liquid crystal layer (the nd value refers to the product of the maximum refractive index of the liquid crystals in the liquid crystal layer and the thickness of the liquid crystal layer, where n represents the maximum refractive index of the liquid crystals in the liquid crystal layer, and d represents the thickness of the liquid crystal layer), the larger the angle of deflection of light after passing through the liquid crystal prism. The light transmittance is larger when the display panel corresponding to the "normally black mode" displays a maximum-grayscale image. Therefore, the light transmittance can be controlled by adjusting the maximum refractive index of the liquid crystals in the liquid crystal layer or the thickness of the liquid crystal layer. In practical applications, when the liquid crystals are arranged horizontally (that is, the major axis of the liquid crystals is substantially parallel to the substrate), the refractive index thereof is the largest, usually 1.8. When the liquid crystals are arranged vertically (that is, the major axis of the liquid crystals is substantially perpendicular to the substrate), the refractive index thereof is the smallest, usually 1.5. When the maximum refractive index of the liquid crystals in the liquid crystal layer needs to be adjusted, the refractive index of liquid crystals in at least one region in the liquid crystal layer may be made to be the maximum refractive index.

In the embodiment of the present disclosure, the adjustment electrode 131 may comprise a variety of structures. For example, the adjustment electrode may comprise a first electrode and a second electrode. The first electrode may comprise a plate-shaped electrode, and the second electrode may comprise a plurality of strip-shaped sub-electrodes arranged in an array. Alternatively, the first electrode may comprise a plurality of strip-shaped sub-electrodes arranged in an array, and the second electrode comprises a plate-shaped electrode. Alternatively, both the first electrode and the second electrode comprise a plurality of strip-shaped sub-electrodes, the sub-electrodes of the first electrode and the sub-electrodes of the second electrode correspond to each other one to one.

In the following description, as an example, the adjustment electrode comprises: a first electrode provided on the first base substrate and a second electrode provided on the second base substrate. The first electrode comprises a plate-shaped electrode and the second electrode comprises a plurality of strip-shaped sub-electrodes. For the control of the structure and manufacturing method of other adjustment electrodes, reference may be made to the structure of the adjustment electrode.

Based on the structure, there are many implementations that there is at least one region in the liquid crystal layer in which the refractive index of the liquid crystals is the maximum refractive index. Hereinafter, the case where the second electrode comprises two sub-electrodes or comprises three sub-electrodes will be described as an example.

First, the case where the second electrode comprises two sub-electrodes will be described.

Figure 6:
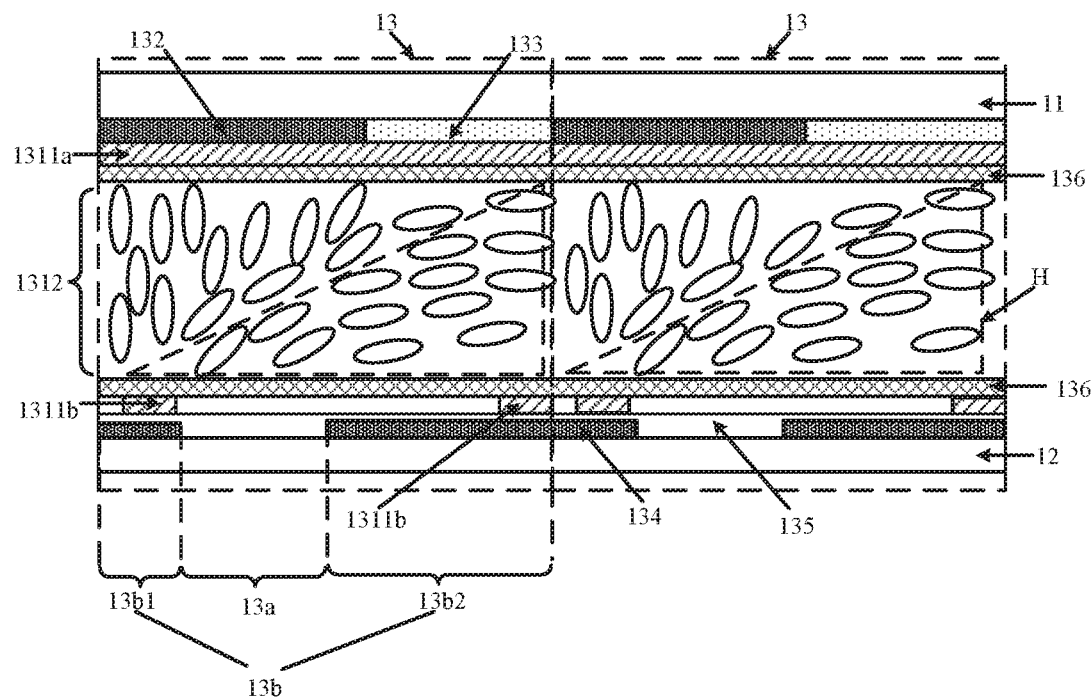
FIG. 6 is a schematic structural view of a display panel provided by a fourth embodiment of the present disclosure.

FIG. 6 is a schematic structural view of a display panel provided by a fourth embodiment of the present disclosure.

The display panel shown in FIG. 6 comprises two pixel units 13. As shown in FIG. 6, as a first aspect, the second electrode provided on the second base substrate 12 corresponding to each pixel unit 13 comprises two strip-shaped sub-electrodes 1311b. The two sub-electrodes 1311b may be provided on the planar layer 135. The first electrode 1311a and the two strip-shaped sub-electrodes 1311b may change the refractive index of the liquid crystals with the deflection of the liquid crystals in the liquid crystal layer. In this case, the liquid crystal layer forms a liquid crystal prism H, which refracts light incident from the second base substrate 12 and further let light transmitted to the scattering medium pattern 133 when a maximum-grayscale image needs to be displayed.

Referring to FIG. 6, based on the working principle of the liquid crystal prism described above, it can be seen that, in order that when a maximum-grayscale image is displayed, light is transmitted to the scattering medium pattern 133 as much as possible so as to improve the transmittance rate, the second base substrate 12 in each pixel unit 13 in FIG. 6 is provided with two strip-shaped sub-electrodes 1311b to form a liquid crystal prism H between two transparent electrodes. In FIG. 6, the refractive index of the liquid crystal prism increases in order from the left to the right, and the refractive index at the rightmost end is the largest. The thickness of the liquid crystal layer needs to ensure that the refractive index at the rightmost end reaches a predetermined value so as to form a liquid crystal prism H between the two transparent electrodes. Therefore, the thickness of the liquid crystal layer 1312 of the pixel unit 13 shown in FIG. 6 is large. In this case, the voltage difference for liquid crystal deflection is high, resulting in large power consumption.

Figure 7:
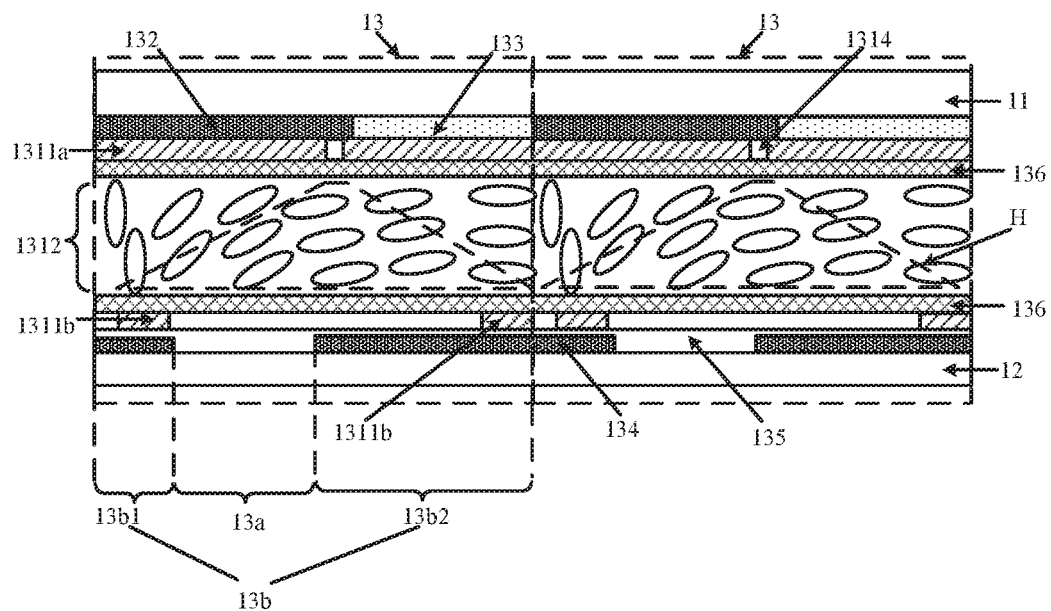
FIG. 7 is a schematic structural view of a display panel provided by a fifth embodiment of the present disclosure.

FIG. 7 is a schematic structural view of a display panel provided by a fifth embodiment of the present disclosure. As shown in FIG. 7, the first electrode 1311a in the display panel is provided with a via 1314. The orthographic projection on the second base substrate 12 of the via 1314 is located in a region between two sub-electrodes 1311b. As the via 1314 is provided above a position between the two sub-electrodes 1311b, the effect of the horizontal electric field in the adjustment electrode is increased to cause the liquid crystals in the corresponding region of the via to be arranged horizontally. The refractive index of the liquid crystals when horizontally arranged is higher than the refractive index of the liquid crystals when vertically arranged. Therefore, with the structure shown in FIG. 7, the liquid crystal prism H can be formed between the two transparent electrodes based on the two sub-electrodes 1311b and the via 1314. In FIG. 7, the refractive index of the liquid crystal prism H first increases, then decreases, from the left to the right, and is the largest at the region corresponding to the via. However, in the display panel shown in FIG. 6, the liquid crystals only can be arranged horizontally until the end of the pixel unit 13. Therefore, compared with the display panel shown in FIG. 6, the thickness of the liquid crystal layer 1312 in the display panel shown in FIG. 7 can be reduced, lowering the voltage difference of liquid crystals deflection, further effectively reducing energy consumption. Optionally, the distances from the center of the orthographic projection on the second base substrate 12 of the via 1314 to the two sub-electrodes 1311b are substantially equal. In this case, the thickness of the liquid crystal layer 1312 is the smallest, the energy consumption is the lowest, and when a maximum-grayscale image is displayed, the light transmittance is large.

It should be noted that the positions of the light-shielding region and the light-transmitting region can be adjusted according to the specific structure of the pixel unit, and the positions of the two can affect the light-emitting efficiency of the liquid crystal layer. Optionally, as shown in FIG. 6 or FIG. 7, in each pixel unit 13, the second light-shielding region 13b comprises a first sub-region 13b1 and a second sub-region 13b2. The orthographic projection on the second base substrate 12 of the first sub-region 13b1 (comprising the first sub-pattern) covers the orthographic projection on the second base substrate 12 of one sub-electrode 1311b (the first sub-electrode). The orthographic projection on the second base substrate 12 of the second sub-region 13b2 (comprising the second sub-pattern) covers the orthographic projection on the second base substrate 12 of the other sub-electrode 1311b (the second sub-electrode). Between the first sub-region 13b1 and the second sub-region 13b2 is the second light-transmitting region 13a. With the display panel as shown in FIG. 6 or FIG. 7, the light-emergent efficiency of the liquid crystal layer is high, for example, up to 80%.

When the pixel unit 13 displays a maximum-grayscale image, there are a variety of implementation manners for the two sub-electrodes 1311b, the first electrode 1311a and the via 1314 to control the liquid crystals to form the liquid crystal prism H. An illustrative description will be given below based on FIG. 7, and the embodiments of the present disclosure are schematically illustrated in the following two possible implementation manners.

Figure 8:
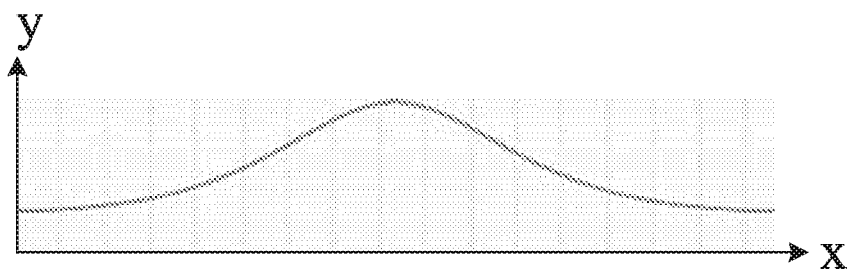
FIG. 8 is an nd value simulation view of a first type of liquid crystal prism formed by the liquid crystal layer in the display panel shown in FIG. 7.

FIG. 8 is an nd value simulation view of a first type of liquid crystal prism formed by the liquid crystal layer in the display panel shown in FIG. 7. In the first implementation manner, a voltage of 0V is applied to the first electrode 1311a, a voltage of 3.2V is applied to both sub-electrodes 1311b, and then the voltage differences between the two sub-electrodes 1311b and the first electrode 1311a both are 3.2V. As shown in FIG. 8, x-axis marks represent different positions in a pixel unit. The x-axis of FIG. 8 is parallel to the width direction of one pixel unit, for example, the width direction may be the x-axis direction in FIG. 7. The y-axis represents the nd value, n represents the maximum refractive index of the liquid crystals in the liquid crystal layer 1312, d represents the thickness of the liquid crystal layer 1312, and the nd value represents the product of the maximum refractive index in the liquid crystal layer 1312 and the thickness of the liquid crystal layer 1312.

Figure 9:
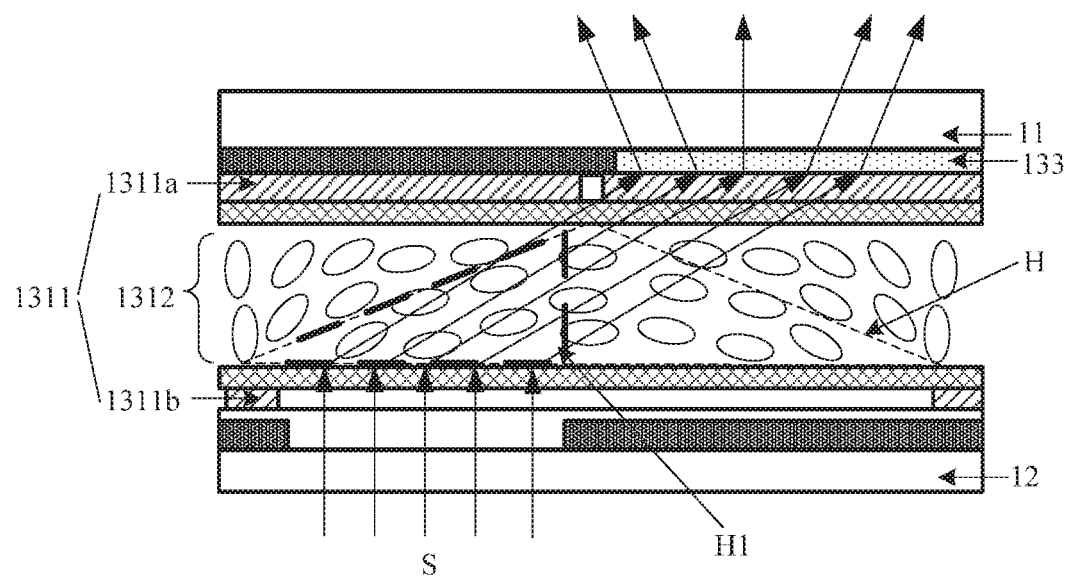
FIG. 9 is a schematic structural view of the pixel unit corresponding to FIG. 8.

FIG. 9 is a schematic structural view of the pixel unit corresponding to FIG. 8. As shown in FIG. 9, when the pixel unit displays a maximum-grayscale image, the light incident from the second base substrate 12 is adjusted by an effective liquid crystal prism H1 of the liquid crystal prism H such that the deflected light passes through the scattering medium pattern 133 and then exits from the first base substrate 11.

In this case, the thickness of the liquid crystal layer needs to ensure that the effective liquid crystal prism H1 can be formed between the two transparent electrodes. Compared with the display panel in FIG. 6, when the width of each pixel unit is the same, the thickness of the liquid crystal layer of the effective liquid crystal prism H1 in FIG. 7 is apparently smaller than the thickness of the liquid crystal layer forming the liquid crystal prism H in FIG. 6.

Figure 10:
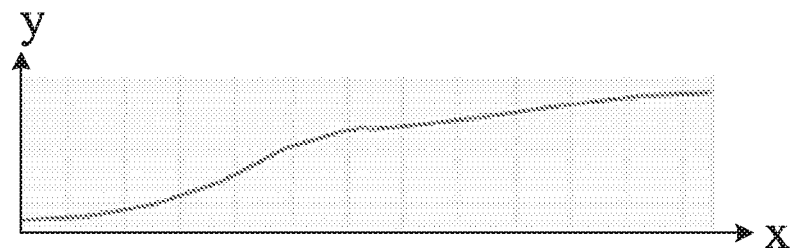
FIG. 10 is an nd value simulation view of a second type of liquid crystal prism formed by the liquid crystal layer in the display panel shown in FIG. 7.

FIG. 10 is an nd value simulation view of a second type of liquid crystal prism formed by the liquid crystal layer in the display panel shown in FIG. 7. In a second possible implementation manner, a voltage of 0V is applied to the first electrode 1311a, a voltage of 8V is applied to one sub-electrode 1311b (the first sub-electrode), and a voltage of 0V is applied to the other sub-electrode 1311b (the second sub-electrode), then the voltage differences between the second electrodes 1311b and the first electrode 1311a are 0V and 8V, respectively. As shown in FIG. 10, the x-axis marks represent different positions in a pixel unit. The x-axis of FIG. 10 is parallel to the width direction of one pixel unit. For example, the width direction may be the x-axis direction in FIG. 7, and the y-axis represents the nd value.

Figure 11:
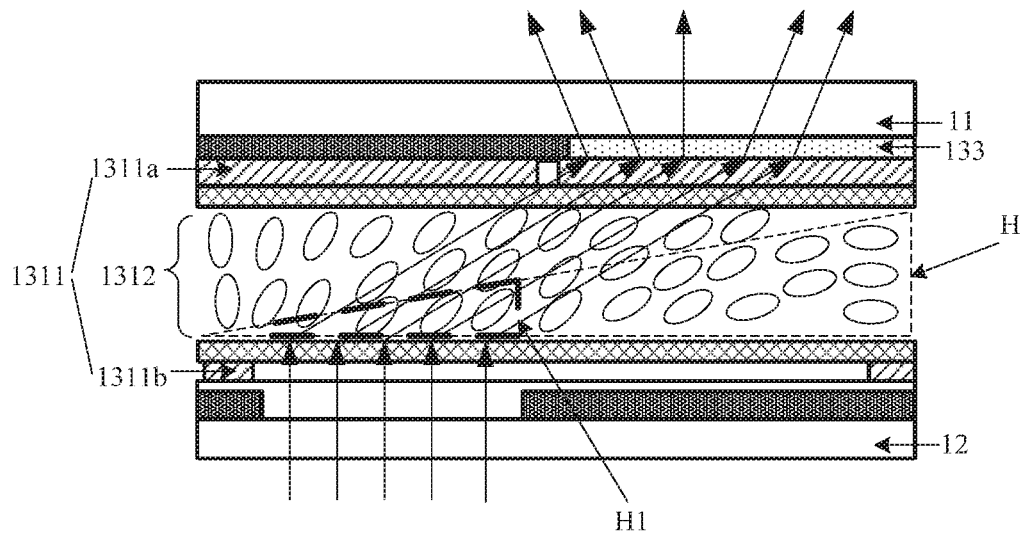
FIG. 11 is a schematic structural view of the pixel unit corresponding to FIG. 10.

FIG. 11 is a schematic structural view of the pixel unit corresponding to FIG. 10. As shown in FIG. 11, FIG. 11 is a schematic structural view of another pixel unit when displaying a maximum-grayscale image according to an embodiment of the present disclosure. When the pixel unit displays a maximum-grayscale image, the light incident from the second base substrate 12 is adjusted by an effective liquid crystal prism H1 of the liquid crystal prism H such that the deflected light passes through the scattering medium pattern 133 and then exits from the first base substrate 11.

Figure 12:
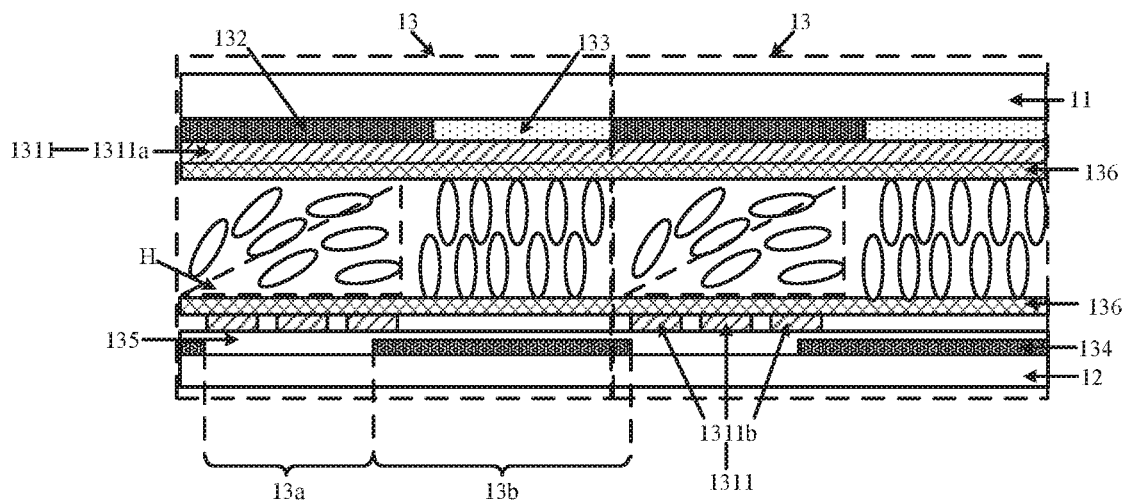
FIG. 12 is a schematic structural view of a display panel provided by a sixth embodiment of the present disclosure.

Now, the case where the second electrode comprises three sub-electrodes will be described. FIG. 12 is a schematic structural view of a display panel provided by a sixth embodiment of the present disclosure. In a second aspect, the second electrode may comprise more than two sub-electrodes. For example, the second electrode comprises three sub-electrodes as an example. Three strip-shaped sub-electrodes 1311b are provided on the second base substrate 12. In each pixel unit 13, the orthographic projection on the second base substrate 12 of at least two sub-electrodes 1311b (the first sub-electrode and the second sub-electrode) among the three sub-electrodes 1311b and the orthographic projection on the second base substrate 12 of the second light-shielding region 13b do not overlap. The orthographic projections of the first sub-electrode and the second sub-electrode may be located in the transparent region 13a. In this case, the first sub-electrode and the second sub-electrode are transparent electrodes. The first electrode 1311a and the three strip-shaped sub-electrodes 1311b can control the liquid crystals to form the liquid crystal prism H. In practical applications, under the condition that the thickness of the liquid crystal layer 1312 is constant, on the premise of ensuring that the three sub-electrodes 1311b are insulated from each other, the smaller the overall width of the three sub-electrodes 1311b, the larger the refractive index of the liquid crystals controlled to form the liquid crystal prism H, such that the angle of deflection of light passing through the liquid crystal layer 1312 is larger, and further the light transmittance can be increased when a maximum-grayscale image is displayed.

Therefore, when at least two of the three sub-electrodes are located in different layers, on the premise of ensuring that the three sub-electrodes 1311b are insulated from each other, the overall width of the three sub-electrodes 1311b can be effectively reduced.

Figure 13:
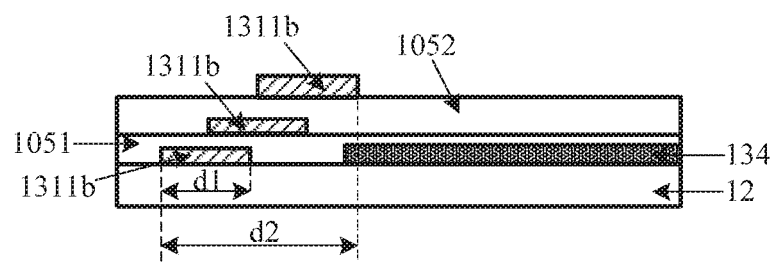
FIG. 13 is a schematic partial structural view of a pixel unit provided by a seventh embodiment of the present disclosure.

FIG. 13 is a schematic partial structural view of a pixel unit provided by a seventh embodiment of the present disclosure. As shown in FIG. 13, in order to locate the first sub-electrode and the second sub-electrode in different layers, the pixel unit further comprises a first planar layer 1051 and a second planar layer 1052. The first planar layer 1051 covers the second light-shielding pattern 134 and extends to the second light-transmitting region 13a. The first sub-electrode is located on the first planar layer 1051. The second planar layer 1052 covers the first sub-electrode. The second sub-electrode is located on the second planar layer 1052.

In addition, FIG. 13 also shows another sub-electrode 1311b (the third sub-electrode), which is covered by the first planar layer 1051 and is provided in the same layer as the second light-shielding pattern 134. Therefore, the first sub-electrode, the second sub-electrode and the third sub-electrode are respectively located in different layers.

In this case, the width d1 of each of the three sub-electrodes may satisfy d1=2.5 μm (micrometers), and the overall width d2 may satisfy d2=5 μm.

Figure 14:
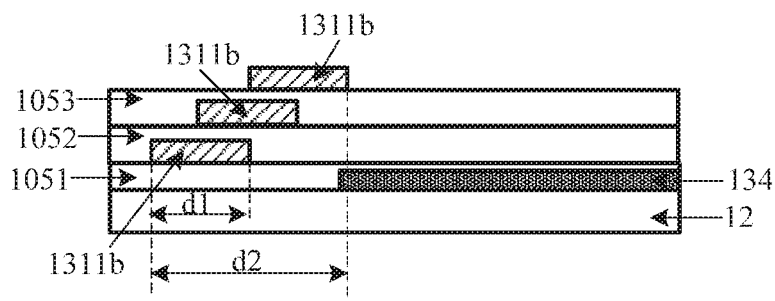
FIG. 14 is a schematic partial structural view of a pixel unit provided by an eighth embodiment of the present disclosure.

FIG. 14 is a schematic partial structural view of a pixel unit provided by an eighth embodiment of the present disclosure. Referring to FIG. 14, the third sub-electrode may not be provided in the same layer as the second light-shielding pattern. FIG. 14 differs from FIG. 13 in that a third planar layer 1053 covering the second sub-electrode is provided on the second planar layer 1052. A third sub-electrode is provided on the third planar layer 1053. Likewise, the width d1 of each of the three sub-electrodes may satisfy d1=2.5 μm, and the overall width d2 may satisfy d2=5 μm.

Figure 15:
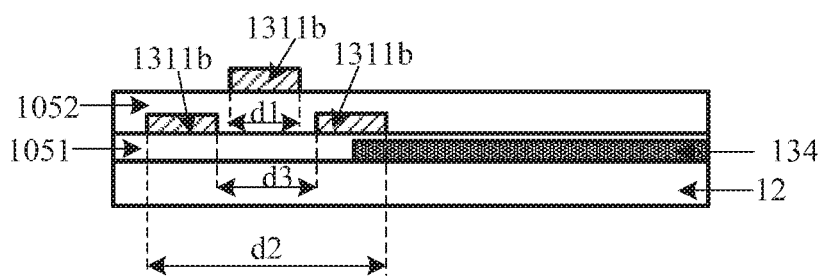
FIG. 15 is a schematic partial structural view of a pixel unit provided by a ninth embodiment of the present disclosure.

FIG. 15 is a schematic partial structural view of a pixel unit provided by a ninth embodiment of the present disclosure. Referring to FIG. 15, the first sub-electrode and the third sub-electrode may be provided in the same layer. FIG. 15 differs from FIG. 13 in that two sub-electrodes 1311b (the first sub-electrode and the third sub-electrode) are provided on the first planar layer 1051. In this case, the width d1 of each of the three sub-electrodes may satisfy d1=1.5 μm, the distance d3 between the two sub-electrodes in the same layer may satisfy d3=2.5 μm, and the overall width d2 of the three sub-electrodes may satisfy d2=5.5 μm.

Figure 16:
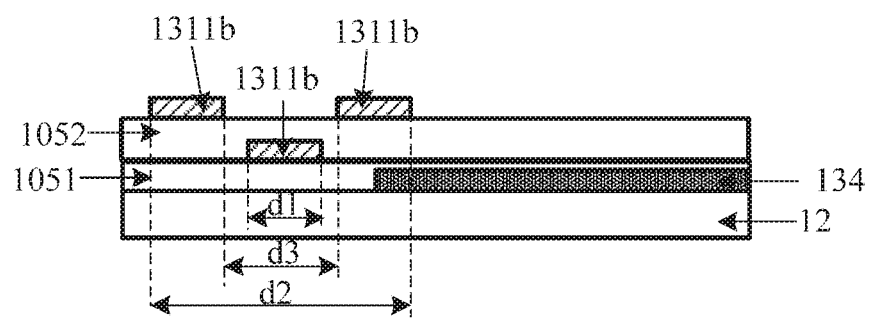
FIG. 16 is a schematic partial structural view of a pixel unit provided by a tenth embodiment of the present disclosure.

FIG. 16 is a schematic partial structural view of a pixel unit provided by a tenth embodiment of the present disclosure. Referring to FIG. 16, the second sub-electrode and the third sub-electrode may be provided in the same layer. FIG. 16 differs from FIG. 13 in that two sub-electrodes 1311b (the second sub-electrode and the third sub-electrode) are provided on the second planar layer 1052. In this case, the width d1 of each of the three sub-electrodes may satisfy d1=1.5 μm, the distance d3 between two sub-electrodes located in the same layer may satisfy d3=2.5 μm, and the overall width d2 of the three sub-electrodes may satisfy d2=5.5 μm.

The scattering medium pattern in the display panel can scatter light, and further can also scatter light of different colors. The layer where the scattering medium pattern is located may be referred to as a color filter layer or a color resist layer. As described above, the scattering medium pattern may further comprise a color filter comprising scattering particles, and such scattering particles cause parallel light emitted from the liquid crystal adjustment unit to be emitted in a scattering manner after being filtered by the color filter, whereby the luminance displayed by the pixel unit is uniform, wherein the material of the scattering particles can be polyethylene terephthalate (referred to as PET).

Furthermore, alternatively or additionally, the first light-transmitting region 11a may further comprise a quantum dot (QD) pattern. The QD pattern is made of QD material. When the incident light is refracted to the QD pattern through the liquid crystal layer, the QD pattern can emit light in a scattering manner upon being excited by the incident light, such that the parallel light emitted from the liquid crystal adjustment unit can be emitted in a scattering manner after passing through the scattering medium pattern, whereby the luminance displayed by the pixel unit is uniform, and as the QD material can emit fluorescent light of different colors, no color filter needs to be attached, simplifying the manufacturing process.

As the color filter's capability to absorb light is also strong, when the QD pattern is used, light utilization efficiency can be effectively improved.

Figure 17:
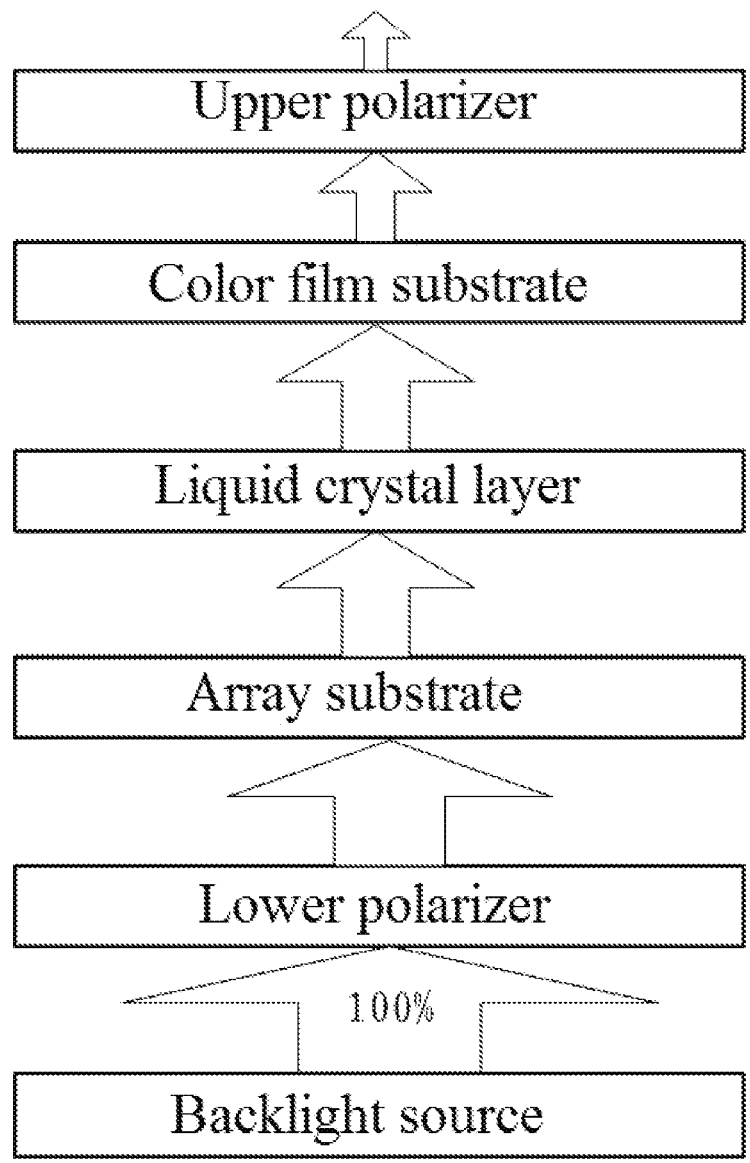
FIG. 17 is a schematic view of the optical path of the light utilization efficiency of the display panel provided as a comparative example.

FIG. 17 is a schematic view of the optical path of the light utilization efficiency of the display panel provided as a comparative example. Referring to FIG. 17, the light emitted by the backlight source sequentially passes through the lower polarizer, the array substrate, the liquid crystal layer, the color film substrate and the upper polarizer, wherein the lower polarizer transmits 43% of the light energy, the array substrate transmits 50% of the light energy, the color film substrate transmits 28% of the light energy, and the upper polarizer transmits 86% of the light energy, then the light transmittance of the display panel is about 100%—43%—50%×28%—86% Therefore, the light transmittance of the display panel provided by the comparative example is about 5%.

As there is no need to provide an upper polarizer and a lower polarizer on the display panel provided in the embodiment of the present disclosure, for example, as shown in FIG. 4, the light emitted by the backlight source sequentially passes through the second light-shielding pattern, the array substrate, the liquid crystal layer and the scattering medium layer. The second shielding pattern transmits 80% of the light energy. As the liquid crystal layer modulates only 50% of the light energy (as shown in FIG. 4, only the left half of one pixel unit is provided with the second electrode to control the implementation of the liquid crystal prism, and the right half of the liquid crystal layer cannot modulate light energy as no second electrode is provided therein), in the embodiment of the present disclosure, assuming that the light-emitting efficiency of the liquid crystal prism is 80%, then the light transmittance of the display panel is about 80%×50%—80%=32%, which is much larger than that of the display panel in the comparative example, whereby the light transmittance of the display panel can be effectively improved.

It should be noted that, in the embodiments of the present disclosure, FIG. 1 to FIG. 5, and FIG. 12 describe the case where three strip-shaped sub-electrodes are mainly arranged in the second light-transmitting region 13a. In this scenario, the liquid crystal layer typically modulates about 50% of the light energy. In practical applications, at least three strip-shaped sub-electrodes may be uniformly distributed in the second light-transmitting region 13a and the second light-shielding region 13b. However, in general, the liquid crystals corresponding to the second light-shielding region 13b have little effect on the modulation of light energy. Therefore, sub-electrodes may not be provided in the second light-shielding region 13b.

It should also be noted that, in the embodiments of the present disclosure, the size and the position of the first light-shielding pattern and the scattering medium layer may be adjusted according to specific scenarios. For example, in the "normally black mode", the first light-shielding pattern in one pixel unit may be located at two ends of the scattering medium layer. In the "normally white mode", the scattering medium layer in one pixel unit may be located at two ends of the first light-shielding pattern. The size and position of the second light-shielding region and the second light-transmitting region on the second base substrate may also be adjusted according to specific scenarios, which is not limited in the embodiments of the present disclosure.

In summary, the display panel provided by the embodiments of the present disclosure can control the deflection of the liquid crystals in the liquid crystal layer with the adjustment electrode in the liquid crystal adjustment unit, to adjust the direction of the light incident on the liquid crystal adjustment unit. After the light passes through the liquid crystal layer, the light-shielding pattern can be used to block the light and/or the light is allowed to pass through the scattering medium pattern, such that different grayscales can be displayed to achieve the purpose of displaying images without the need for a polarizer, thereby effectively improving the light transmittance of the display panel.

Figure 18:
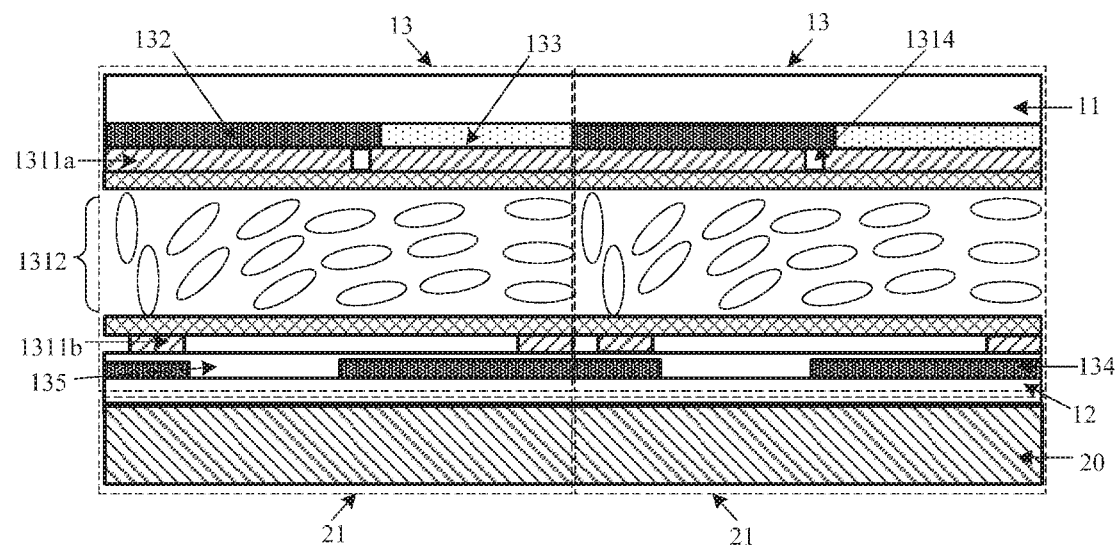
FIG. 18 is a schematic structural view of a display device provided by an eleventh embodiment of the present disclosure.

FIG. 8 is a schematic structural view of a display device provided by an eleventh embodiment of the present disclosure. As shown in FIG. 18, embodiments of the present disclosure further provide a display device. The display device may comprise any one of the display panels described above, and a backlight source 20 provided at the second side of the display panel. The backlight source 20 comprises a plurality of light-emitting units 21. The plurality of light-emitting units 21 correspond to the plurality of pixel units 13 one to one. As shown in FIG. 18, the pixel units 13 are arranged in an array between two base substrates. The first light-shielding patterns 132 are provided with the scattering medium pattern 133 therebetween. The second light-shielding patterns 134 of the two adjacent pixel units 13 can be provided adjacent to each other, such that the pattern design of a mask can be simplified and the manufacturing precision can be improved when the second light-shielding pattern is manufactured.

Optionally, the light emitted by each light-emitting unit is perpendicular to at least one of the first base substrate and the second base substrate. The light-emitting unit comprises a light-emitting diode (LED for short). When the first light-transmitting region 11a in the display panel comprises a quantum dot (QD) pattern and the QD pattern emits light of at least one of red color and green color under light irradiation, the LED can be a blue color LED.

Figure 19:
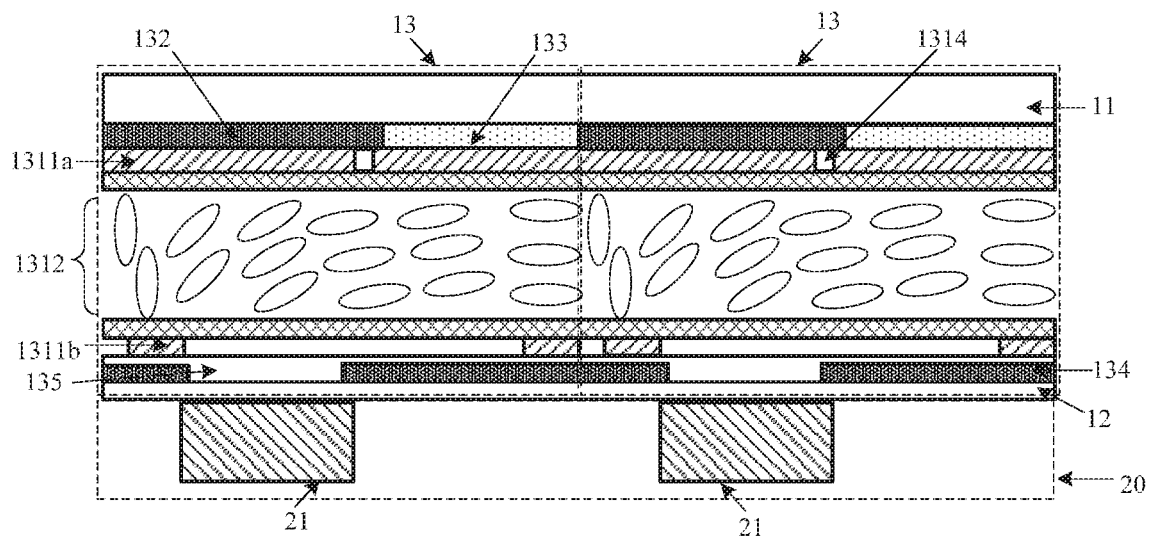
FIG. 19 is a schematic structural view of a display device provided by a twelfth embodiment of the present disclosure.

FIG. 19 is a schematic structural view of a display device provided by a twelfth embodiment of the present disclosure. In practical applications, each light-emitting unit may be provided only in the light-transmitting region or its light-emitting surface faces the light-transmitting region, which can effectively increase light utilization. For example, a light converging unit may be provided between each LED in the backlight source and the second base substrate, such that the converged parallel light is incident from the light-transmitting region. Alternatively, as compared with the display device shown in FIG. 18 in which the light-emitting area of each light-emitting unit is reduced, as shown in FIG. 19, the light-emitting unit is provided in the light-transmitting region such that the light-emitting surface of the light-emitting unit directly faces the light-transmitting region.

In summary, the display device provided by the embodiments of the present disclosure can control the deflection of the liquid crystals in the liquid crystal layer with the adjustment electrodes in the liquid crystal adjustment unit, to adjust the direction of the light incident on the liquid crystal adjustment unit. After the light passes through the liquid crystal layer, the light-shielding pattern can be used to block light and/or the light is allowed to pass through the light-transmitting region, such that different grayscales can be displayed to achieve the purpose of displaying images without the need for a polarizer, thereby effectively improving the light transmittance of the display panel. Further provided in the embodiment of the present disclosure is a control method of a display device, which may be applied to the display device shown in FIG. 18 or 19. The method may comprise: controlling the voltage on the adjustment electrode of each pixel unit to deflect the liquid crystals in the liquid crystal layer; and transmitting the light from the backlight source to at least one of the first light-shielding region and the first light-transmitting region.

Figure 20:
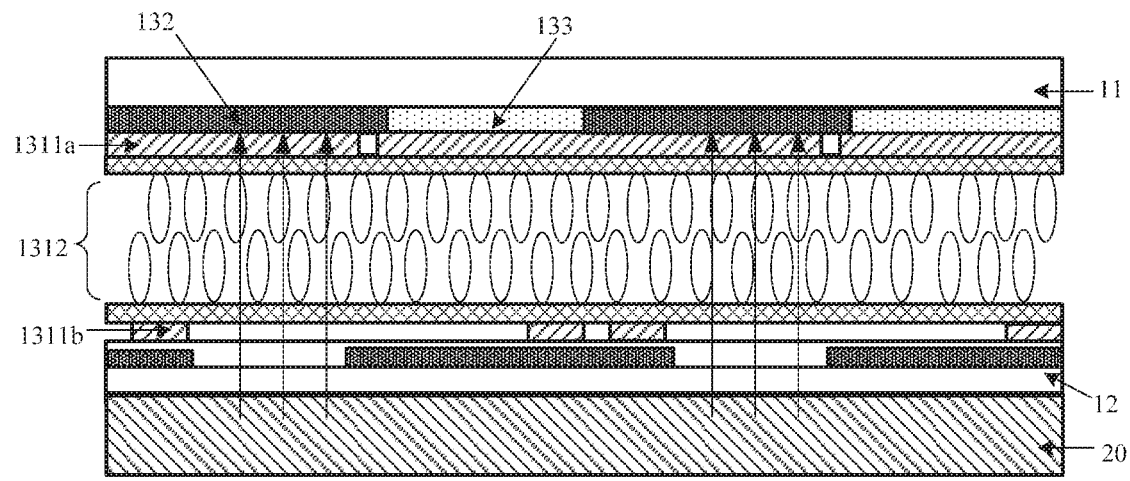
FIG. 20 is a schematic structural view of the display device of FIG. 18 when it is required to display a zero-grayscale image.

FIG. 20 is a schematic structural view of the display device of FIG. 18 when it is required to display a zero-grayscale image. When a zero-grayscale image is displayed, the light incident from the backlight source is transmitted to the light-shielding pattern through the liquid crystal layer by controlling the voltage between the first electrode and the second electrode, and in this case, no light exists from the first base substrate. The display panel of the display device in FIG. 20 is a "normally black mode" display panel, which controls the voltage between the first electrode 1311a and the second electrode 1311b to be zero, that is, no voltage is applied to the first electrode 1311a and the second electrode 1311b, such that the liquid crystals in the liquid crystal layer are not deflected, then the light incident from the backlight source 20 passes through the liquid crystal layer 1312 and is transmitted to the light-shielding pattern 132. In this case, no light exists from the first base substrate 11. For the specific control process, reference may be made to the light control process in FIG. 4.

Figure 21:
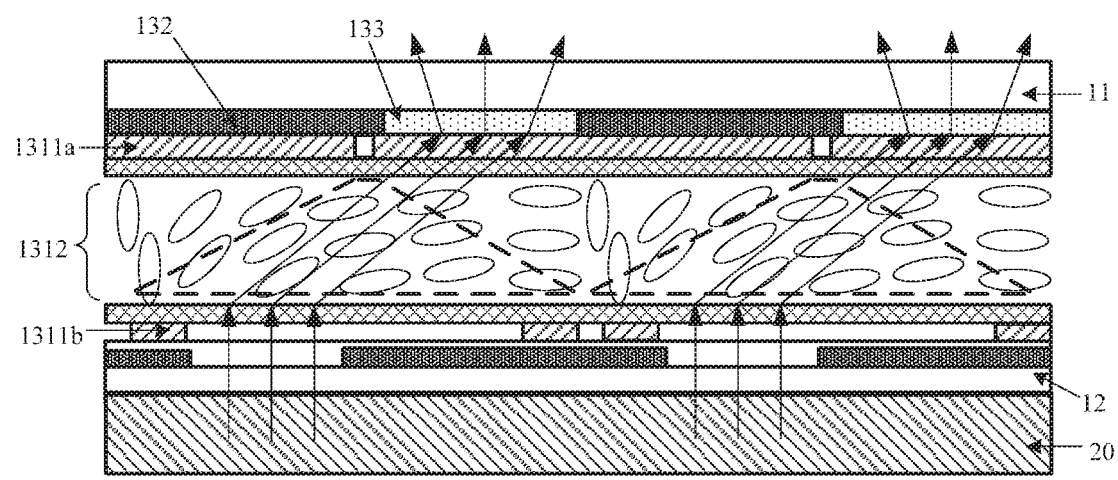
FIG. 21 is a schematic structural view of the display device of FIG. 18 when it is required to display a maximum-grayscale image.

FIG. 21 is a schematic structural view of the display device of FIG. 18 when it is required to display a maximum-grayscale image. When displaying a maximum-grayscale image, the display device controls the voltage between the first electrode 1311a and the second electrode 1311b such that the light incident from the backlight source 20 is transmitted to the scattering medium pattern 133 through the liquid crystal layer 1312, and in this case, the light passing through the liquid crystal layer 1312 entirely exists from the first base substrate 11.

Figure 22:
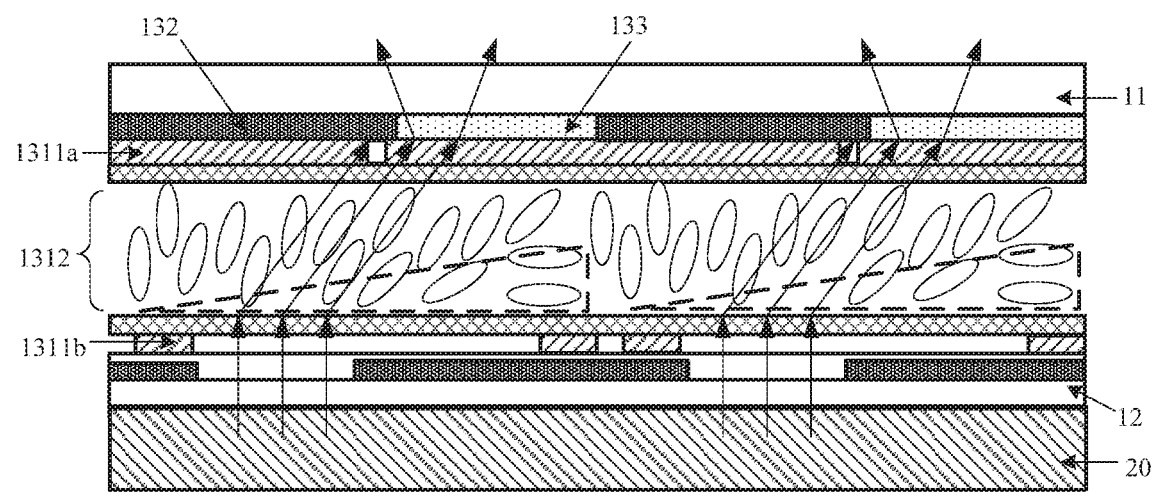
FIG. 22 is a schematic view of the display device of FIG. 18 when it is required to display an N-grayscale image.

FIG. 22 is a schematic view of the display device of FIG. 18 when it is required to display an N-grayscale image. When displaying an N-grayscale image, the display device controls the voltage between the first electrode 1311a and the second electrode 1311b, such that a part of the light incident from the backlight source 20 passing through the liquid crystal layer 1312 transmitted to the light-shielding pattern 132, and the other part is transmitted to the scattering medium pattern 133, where 0<N<M, and M is the maximum grayscale. In this case, only a part of light passing through the liquid crystal layer 1312 exists from the first base substrate 11.

The control method of the display device described above is schematically illustrated based on the "normally black mode" display device, while the "normally white mode" display panel in the "normally white mode" display device has the same structure as the "normally black mode" display panel except that the positions of the first light-shielding pattern 132 and the scattering medium pattern 133 in the "normal white mode" display panel are opposite to the positions of the first light-shielding pattern 132 and the scattering medium pattern 133 in the "normally black mode" display panel. In the case of displaying a zero-grayscale image and a maximum-grayscale image, the voltage applied to the adjustment electrode of the "normally white mode" display panel may be opposite to the voltage applied to the adjustment electrode of the "normally black mode" display panel. For other part of the control method, reference may be made to the control method of the "normally black mode" display panel.

Exemplarily, when the display panel of the display device is a "normally white mode" display panel, the specific control method thereof is as follows:

When it is required to display a zero-grayscale image, the light incident from the backlight source is transmitted to the light-shielding pattern through the liquid crystal layer by controlling the voltage between the first electrode and the second electrode, and in this case, no light exists from the first base substrate. For example, a liquid crystal prism is formed between the first electrode and the second electrode by controlling the voltage between the first electrode and the second electrode, such that the light incident from the backlight source is transmitted to the light-shielding pattern through the liquid crystal layer, and in this case, no light exists from the first base substrate. Assuming that the structure of the "normally white mode" display panel except for the first light-shielding pattern 132 and the scattering medium pattern 133 is the same as that of FIG. 6 or 7, a voltage of 0V may be applied to the first electrode 1311a, a voltage of 3.2V may be applied to the two second electrodes 1311b, or a voltage of 0V may be applied to the first electrode 1311a, a voltage of 8V may be applied to one second electrode 1311b, and a voltage of 0V may be applied to the other second electrode 1311b. For the specific process, reference may be made to the above-mentioned two possible implementation manners in FIG. 6 or FIG. 7 in which the display panel controls the liquid crystal prism H.

When a maximum-grayscale image needs to be displayed, the light incident from the backlight source is transmitted to the scattering medium pattern through the liquid crystal layer by controlling the voltage between the first electrode and the second electrode, and in this case, the light passing through the liquid crystal layer all exists from the first base substrate. Specifically, by controlling the voltage between the first electrode and the second electrode to be zero, that is, no voltage is applied to the first electrode and the second electrode, the liquid crystals in the liquid crystal layer are not deflected, such that the light incident from the backlight source passes through the liquid crystal layer and is transmitted to the scattering medium pattern. For the specific control process, reference may be made to the light control process in FIG. 4.

Regardless the "normally black mode" display device or the "normally white mode" display device, when an N-grayscale image needs to be displayed, by controlling the voltage between the first electrode and the second electrode, the light incident from the backlight source passes through the liquid crystal layer, a part thereof is transmitted to the light-shielding pattern, and the other part thereof is transmitted to the scattering medium pattern, where 0<N<M, and M is the maximum grayscale. In this case, only a part of light passing through the liquid crystal layer exists from the first base substrate.

Optionally, the process of controlling the voltage between the first electrode and the second electrode such that the light incident from the backlight source is transmitted to the light-shielding pattern and/or the scattering medium pattern through the liquid crystal layer between the first electrode and the second electrode may specifically comprise:

S1, determining a target grayscale to be displayed.

S2, querying the preset correlation between grayscales and voltages to obtain a target voltage corresponding to the target grayscale.

S3, applying a target voltage between the first electrode and the second electrode such that the light incident from the backlight source passes through the liquid crystal layer between the first electrode and the second electrode and is transmitted to the light-shielding pattern and/or the scattering medium pattern.

Those skilled in the art may clearly understand that, for the convenience and simplicity of description, reference may be made to the corresponding processes in the foregoing embodiments of the display panel and the display device for the specific steps of the method described above, and details thereof are not described herein again.

In summary, in the control method of the display device provided by the embodiments of the present disclosure, the deflection of the liquid crystals in the liquid crystal layer can be controlled by means of the adjustment electrode in the liquid crystal adjustment unit, to adjust the direction of the light incident on the liquid crystal adjustment unit, and after the light passes through the liquid crystal layer, the light-shielding pattern can be used to block the light and/or the light is allowed to pass through the scattering medium pattern, such that different grayscales can be displayed for the purpose of displaying the image without the need for a polarizer, thereby effectively improving the light transmittance of the display panel.

Further provided in the embodiments of the present disclosure is a manufacturing method of a display panel. In this manufacturing method, two base substrates are provided, and the two base substrates are provided oppositely. A plurality of pixel units arranged in an array are formed between two base substrates, each of the pixel units comprising: a liquid crystal adjustment unit provided between the two base substrates; and a light-shielding region and a light-transmitting region at the light emergent side of the liquid crystal adjustment unit. The liquid crystal adjustment unit may comprise an adjustment electrode and a liquid crystal layer. The adjustment electrode is configured to control the deflection of the liquid crystals in the liquid crystal layer such that the light incident on the liquid crystal adjustment unit is transmitted to at least one of the light-shielding region and the light-transmitting region through the liquid crystal layer.

In summary, the manufacturing method of the display panel provided in the embodiments of the present disclosure forms a plurality of pixel units arranged in an array between two base substrates. Each pixel unit may comprise: a liquid crystal adjustment unit provided between two base substrates, and a light-shielding pattern and a scattering medium pattern at the light emergent side of the liquid crystal adjustment unit. The direction of the light incident on the liquid crystal adjustment unit may be adjusted by controlling the deflection of the liquid crystals in the liquid crystal layer by means of the adjustment electrode in the liquid crystal adjustment unit. After the light passes through the liquid crystal layer, the light-shielding pattern can be used to block the light and/or the light is allowed to pass through the scattering medium pattern, such that different grayscales can be displayed to achieve the purpose of displaying the image without the need for a polarizer, thereby effectively improving the light transmittance of the display panel.

Optionally, the two base substrates may comprise a first base substrate and a second base substrate, and the process of forming a plurality of pixel units arranged in an array between the two base substrates may comprise:

A1: forming a plurality of first light-shielding patterns and a plurality of scattering medium patterns on the first base substrate.

Optionally, the first light-shielding patterns may be a black matrix. Specifically, firstly, a photosensitive material layer may be formed on the first base substrate, and the photosensitive material layer is exposed and developed to obtain a black matrix. Thereafter, a scattering medium layer is formed on the first base substrate, and then a plurality of scattering medium patterns are formed by a single patterning process. The single patterning process may comprise photoresist coating, exposing, developing, etching and photoresist stripping.

A2, the first electrode is formed on the first base substrate having a plurality of light-shielding patterns and a plurality of scattering medium patterns formed thereon.

Optionally, the first electrode may comprise one or more sub-electrodes. When the first electrode has one sub-electrode, the first electrode may be a plate-shaped transparent electrode, and may be formed by one of depositing, coating, sputtering, etc.; when the first electrode has a plurality of sub-electrodes, a plurality of strip-shaped sub-electrodes arranged in an array are formed on the first base substrate. A transparent electrode layer may be formed on the first base substrate first, and then a plurality of strip-shaped sub-electrodes arranged in the array described above is formed by a single patterning process.

A3, an alignment layer is formed on the first base substrate having the first electrode formed thereon.

Optionally, the alignment layer may be formed, by one of deposition, coating, sputtering, and the like, on the first base substrate having the first electrode formed thereon.

A4, a plurality of second light-shielding patterns are formed on the second base substrate. Optionally, the second light-shielding patterns may be a black matrix. Specifically, first, a photosensitive material layer may be formed on the first base substrate, and the photosensitive material layer is exposed and developed to obtain a black matrix.

A5, the second electrode is formed on the second base substrate having a plurality of light-shielding patterns and a plurality of scattering medium patterns formed thereon.

Optionally, the second electrode may comprise one or more sub-electrodes. When the second electrode has one sub-electrode, the second electrode may be a plate-shaped transparent electrode, and the sub-electrode may be formed by one of deposition, coating, sputtering and the like; when the second electrode has a plurality of sub-electrodes, a plurality of strip-shaped sub-electrodes arranged in an array are formed on the second base substrate, a transparent electrode layer may be formed on the second base substrate first, and then a plurality of strip-shaped sub-electrodes arranged in the array described above are formed by a single patterning process again.

It should be noted that at least one of the first electrode and the second electrode comprises a plurality of strip-shaped sub-electrodes arranged in an array.

A6: the alignment layer is formed on the second base substrate having the second electrode formed thereon.

Optionally, the alignment layer may be formed, by one of deposition, coating, sputtering and the like, on the second base substrate having the second electrode formed thereon.

A7, dripping liquid crystals between the first base substrate and the second base substrate, forming the first base substrate and the second base substrate in cell to obtain a display panel in which the film layer between the first base substrate and the second base substrate may be divided into a plurality of pixel units as described above.

It should be noted that, as shown in FIG. 1, the film layer between the first base substrate 11 and the second base substrate 12 in the display panel may be divided into the plurality of pixel units 13, and for the specific stricture of the pixel unit 13, reference may be made to FIG. 2, which is not repeated here.

It should be noted that, the manufacturing method of the display panel provided in the embodiments of the present disclosure is only schematically illustrated, while other methods may also be used in practical applications, which will not be limited in the embodiments of the present disclosure. The order of the steps in the embodiments of the present disclosure may be adjusted appropriately, and the steps may also be added or deleted according to the situation. Any method of which those skilled in the art may easily think of variations shall fall within the protection scope of the present disclosure and is not repeated herein.

Those skilled in the art may clearly understand that for the specific steps of the method described above, reference may be made to the corresponding processes in the foregoing embodiments of the display panel and the display device for the convenience and simplicity of description, and details are not described herein again.

In summary, the manufacturing method of the display panel provided in the embodiments of the present disclosure forms a plurality of pixel units arranged in an array between two base substrates. Each pixel unit may comprise: a liquid crystal adjustment unit provided between two base substrates, and a light-shielding pattern and a scattering medium pattern provided at the light emergent side of the liquid crystal adjustment unit. The direction of the light incident on the liquid crystal adjustment unit may be adjusted by controlling the deflection of the liquid crystals in the liquid crystal layer by means of the adjustment electrode in the liquid crystal adjustment unit. After the light passes through the liquid crystal layer, the light-shielding pattern can be used to block the light and/or the light is allowed to pass through the scattering medium pattern, such that different grayscales can be displayed to achieve the purpose of displaying the image without the need for a polarizer, thereby effectively improving the light transmittance of the display panel.

Those of ordinary skill in the art should understand that all or part of the steps of implementing the foregoing embodiments may be implemented by hardware or by instructing relevant hardware through a program. The program may be stored in a computer-readable storage medium and the foregoing storage medium may be a read only memory, a magnetic disk or an optical disk.

The foregoing is merely about optional embodiments of the present disclosure and is not intended to limit the present disclosure. Any modifications, equivalent substitutions, improvements and the like made within the spirit and principle of the disclosure should be encompassed in the scope of protection of the present disclosure.

What is claimed is:

1. A display panel, comprising:
   a first base substrate and a second base substrate that are positioned opposite to each other; and
   a plurality of pixel units positioned between the first base substrate and the second base substrate;
   wherein a pixel unit of the plurality of pixel units comprises:
   a liquid crystal adjustment unit;
   a first light-shielding region and a first light-transmitting region that are located at a first side of the liquid crystal adjustment unit;
   a second light-shielding region and a second light-transmitting region that are located at a second side of the liquid crystal adjustment unit;
   a first light-shielding pattern located in the first light-shielding region and positioned on the first base substrate; and
   a second light-shielding pattern located in the second light-shielding region and positioned on the second base substrate;
   wherein the liquid crystal adjustment unit comprises an adjustment electrode and a liquid crystal layer;
   wherein the adjustment electrode is configured to control the deflection of liquid crystals in the liquid crystal layer such that a light from a second side of the liquid crystal adjustment unit is transmitted to at least one of the first light-shielding region and the first light-transmitting region; and
   wherein the first base substrate is located at a first side of the pixel unit, and the second base substrate is located at a second side of the pixel unit.

2. The display panel according to claim 1,
   wherein the pixel unit further comprises a scattering medium pattern located in the first light-transmitting region; and
   wherein the scattering medium pattern is configured to scatter a light transmitted to the first light-transmitting region.

3. The display panel according to claim 2,
   wherein the scattering medium pattern comprises a color filter; and
   wherein the color filter includes a plurality of scattering particles for scattering light.

4. The display panel according to claim 1,
   wherein the pixel unit further comprises a quantum dot element located in the first light-transmitting region; and
   wherein the quantum dot element is configured to emit a light in response to excitation by a light transmitted to the first light-transmitting region.

5. The display panel according to claim 4,
   wherein the quantum dot element is excitable by a blue light to emit at least one of a red light and a green light.

6. The display panel according to claim 4,
   wherein the quantum dot element is configured to emit the light in a scattering manner.

7. The display panel according to claim 1,
   wherein the adjustment electrode comprises a first electrode located on the first base substrate, and a second electrode located on the second base substrate; and
   wherein the first electrode comprises a plate-shaped electrode, and the second electrode comprises strip-shaped first and second sub-electrodes.

8. The display panel according to claim 7,
   wherein the first sub-electrode and the second sub-electrode are respectively located at two ends of the pixel unit;
   wherein the pixel unit further comprises a first planar layer covering the second light-shielding pattern and extending to the first light-transmitting region; and
   wherein the first sub-electrode and the second sub-electrode are located on the first planar layer.

9. The display panel according to claim 8,
   wherein the second light-shielding pattern comprises a first sub-pattern and a second sub-pattern;
   wherein the first sub-pattern and the second sub-pattern are respectively located at two ends of the pixel unit;
   wherein an orthographic projection on the second base substrate of the first sub-pattern covers an orthographic projection on the second base substrate of the first sub-electrode; and
   wherein an orthographic projection on the second base substrate of the second sub-pattern covers an orthographic projection on the second base substrate of the second sub-electrode.

10. The display panel according to claim 8,
    wherein the first electrode includes a via; and
    wherein an orthographic projection on the second base substrate of the via is located between the orthographic projection on the second base substrate of the first sub-electrode and the orthographic projection on the second base substrate of the second sub-electrode.

11. The display panel according to claim 10, wherein a distance from the orthographic projection on the second base substrate of the via to the orthographic projection on the second base substrate of the first sub-electrode is substantially equal to a distance from the orthographic projection on the second base substrate of the via to the orthographic projection on the second base substrate of the second sub-electrode.

12. The display panel according to claim 7, wherein both the first sub-electrode and the second sub-electrode are transparent electrodes, and are located in the second light-transmitting region.

13. The display panel according to claim 12, wherein the pixel unit further comprises a first planar layer and a second planar layer;
wherein the first planar layer covers the second light-shielding pattern and extends to the second light-transmitting region;
wherein the first sub-electrode is located on the first planar layer;
wherein the second planar layer covers the first sub-electrode; and
wherein the second sub-electrode is located on the second planar layer.

14. The display panel according to claim 13, wherein the second electrode further comprises a third sub-electrode; and
wherein the third sub-electrode is:
covered by the first planar layer; or
located on the first planar layer and covered by the second planar layer; or
located on the second planar layer; or
located on a third planar layer, wherein the third planar layer covers the second sub-electrode.

15. A display device, comprising:
the display panel according to claim 1; and
a backlight source located at a second side of the display panel;
wherein the backlight source comprises a plurality of light-emitting units, and the plurality of light-emitting units correspond to the plurality of pixel units one to one; and
wherein a light emitted by a light-emitting unit of the plurality of light-emitting units is perpendicular to at least one of the first base substrate and the second base substrate.

16. The display device according to claim 15, wherein the light-emitting unit comprises a light-emitting diode.

17. The display device according to claim 16, wherein the light-emitting diode is a blue light-emitting diode.

18. A control method of a display device for controlling the display device according to claim 15, the method comprising:
controlling the voltage on the adjustment electrode of each pixel unit to deflect the liquid crystals in the liquid crystal layer; and
transmitting a light from the backlight source to at least one of the first light-shielding region and the first light-transmitting region.

19. The control method according to claim 18, comprising:
transmitting the light from the backlight source to the first light-shielding region, to display a zero-grayscale image;
transmitting the light from the backlight source to the first light-transmitting region, to display a maximum-grayscale image; and
transmitting the light from the backlight source to the first light-shielding region and the first light-transmitting region, to display an N-grayscale image, wherein $0<N<M$, and M is the maximum grayscale.

* * * * *